United States Patent Office 3,439,032
Patented Apr. 15, 1969

3,439,032
ALKALI AMINOPHOSPHIDES AND ALKALINE EARTH AMINOPHOSPHIDES AND PROCESS OF PREPARATION
Ludwig Maier, Zurich, Switzerland, assignor to Monsanto Company, St. Louis, Mo., a corporation of Delaware
No Drawing. Filed Aug. 5, 1966, Ser. No. 570,445
Claims priority, application Switzerland, Aug. 11, 1965, 11,364/65
Int. Cl. C07f 9/02, 9/58, 9/60
U.S. Cl. 260—551                7 Claims

ABSTRACT OF THE DISCLOSURE

Alkali and alkaline earth aminophosphides of the formulae $MP(NR^1R^2)_2$ and $M_2PNR^1R^2$ where M is an alkali or alkaline earth metal and $R^1$ and $R^2$ are hydrogen atoms or organic groups, and process for preparing by reacting white phosphorus with a metal amide.

---

The present invention concerns alkali aminophosphides and alkaline earth aminophosphides and a process for preparing them. These aminophosphides are of the formulae $$MP(NR^1R^2)_2$$

and $$M_2PNR^1R^2$$

in which M signifies an alkali metal atom or a part of an alkaline earth metal atom, the other part being satisfied by a $PNR^1R^2$ group, an $R^1$ group or a group that does not interfere with the process of the invention, and $NR^1R^2$ is the residue of a primary or secondary amine or $NH_2$.

The compounds of this class have not been previously known. The known aminophosphines have been produced by exchange of halogen linked with phosphorus with amino groups.

It has now been found that one obtains alkali aminophosphides and alkaline earth aminophosphides of the above mentioned formulae on heating white phosphorus together with an alkali amide or alkaline earth amide. This new reaction is carried out according to the equation:

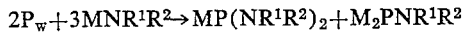

As can be seen from the equation, the white phosphorus and the metal amide are suitably used in a proportion of 2:3. However, an excess quantity of phosphorus can also be used, because it is easy to separate the phosphorus which has not reacted.

In principle, ammonia and all existing primary and secondary amines can be used, to the extent that an alkali metal derivative can be prepared therefrom.

The groups $R^1$ and $R^2$, which appear in the amines signify hydrogen atoms or organic groups such as e.g. alkyls, alkenyls and alkynyls like methyl, ethyl, vinyl, ethynyl, n-propyl, iso-propyl, allyl, propenyl, propargyl, proponyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups having up to 24 carbon atoms like undecenyl, dodecyl, myristyl, oleyl, tetracosyl; cycloalkyls and cycloalkenyls like cyclopentyl, cyclopentenyl, cyclopentadienyl, cyclohexyl, cyclohexenyl, cyclohexadienyl and larger alicyclic groups having up to 12 carbon atoms like cyclooctyl, cyclododecyl, cyclooctatrienyl, cyclododecatrienyl, bicyclohexyl; aralkyls, aralkenyls and aralkynyls like benzyl, cuminyl, phenylethyl, styryl, phenylethynyl, phenylpropyl, 3-phenylallyl, 2-phenylallyl, cinnamyl, 1-phenylpropynyl, diphenylmethyl, triphenylmethyl, 1-naphthylmethyl, 2-naphthylmethyl, 1-naphthylethyl, 2-naphthylethyl, 1-naphthylvinyl, 2-naphthylvinyl, 1-naphthylethynyl, 2-naphthylethynyl; alkaryls, alkenylaryls and alkynylaryls like tolyl, xylyl, mesityl, duryl, ethylphenyl, cumyl, vinylphenyl, ethynylphenyl, propargylphenyl, propynylphenyl, tert-butylphenyl, 1-vinylnaphthyl, 2-vinylnaphthyl, 1-ethynylnaphthyl, 2-ethynylnaphthyl; aryls like phenyl, ortho-biphenylyl, meta-biphenylyl, para-biphenylyl, p-terphenylyl, meta-terphenylyl, 1-naphthyl, 2-naphthyl, 2-anthryl, 9-anthryl, 1-phenanthryl, 2-phenanthryl, 4-phenanthryl, 3-phenanthryl, 9-phenanthryl; and heterocyclic groups like pyrryl, furyl, benzofuryl, thienyl, pyrrolinyl, pyrazolyl, pyrazolinyl, imidazolyl, thiazolyl, oxazolyl, isooxazolyl, pyrazinyl, pyrimidyl, pyridazinyl, pyridyl, pyranyl, thiopyranyl, piperidyl, morpholinyl, thiazinyl, triazinyl, quinolyl, quinazolyl, quinoxalyl, indolyl and carbazolyl, whereby the hydrogen atoms can be replaced by a hydrocarbon group in existing NH-groups. $R^1$ and $R^2$, taken together, can form a heterocyclic structure with the nitrogen atom, such as e.g. piperidino, morpholino, N-trimethylsilylpiperazino etc.

It has also been found that the amines which are employed can also contain further substituents, such as ether groups, tertiary amino groups, as long as it is still possible to produce an alkali metal derivative of the corresponding amine.

The reaction of invention is usually carried out in an inert solvent. Suitable solvents are e.g. straight or branched paraffins such as propane, n-hexane, iso-hexane, 2,4,4-trimethylpentane, n-octane, iso-octane, n-decane, n-dodecane etc.; cycloparaffins such as cyclohexane, methylcyclohexane, cycloheptane, cyclooctane etc.; aromatic hydrocarbons such as benzene, toluene, xylene, ethylbenzene, 1-methylnaphthalene, 1,4-dimethylnaphthalene, 2-ethylnaphthalene etc.; hydroaromatic hydrocarbons such as tetralin, decalin etc.; moreover, aliphatic ether such as methyl-ethylether, ethylether, isopropylether, n-propylether, ethyl-n-butylether, n-butylether, iso-butylether, ethyleneglycoldimethylether, diethyleneglycoldimethylether, benzyl-methylether etc.; aromatic ethers such as anisol, phenetol, veratrol, phenylether, phenyl-benzylether etc.; cyclic ether such as furan, tetrahydrofuran, tetrahydrofurfurylethylether, dioxane etc.; additional suitable solvents are acetonitrile, benzonitrile, dimethylsulfone, dimethylsulfoxide, tetramethylenesulfoxide, dimethylformamide, dimethylacetamide, ethylacetate, N-ethylmorpholine, pyridine, quinoline, N,N'-dialkylpiperazine, tetramethylurea and the like.

The choice of the suitable solvent depends on the solubility of the metal amide and also on their method of preparation. The principal processes are (a) the direct treatment of the amines with metallic sodium, potassium, lithium, magnesium, strontium, barium, calcium, aluminum and the like, which is applicable when the hydrogen to be replaced possesses enough acid character; (b) the reaction with a corresponding organometal compound such as lithium butyl, sodium phenyl, dimethyl barium, dimethyl calcium, dimethyl strontium, diethyl magnesium etc.; and (c) the action of hydrides of the alkali metals such as sodium hydride, potassium hydride and lithium hydride.

Depending on the method of preparation and also on the kind of solvent (donor properties), undesired reductions of the solvent or of reducible substituents which may be present can be avoided.

On practicing the invention the metal amide is suitably prepared first. It is able to completely dissolve white phosphorus more or less quickly on heating in the proportion indicated above, either itself when it is liquid at the reaction temperature, or else as a solution. Depending on the applied method, that is on the quantity and the kind of the solvent, the kind of the metal amide and the reaction temperature in the range of 30° to 120° C., the duration of the reaction amounts to some minutes till several hours. The reaction proceeds quantitatively and one finally obtains an equimolar mixture of the two novel compounds which are shown by formulae at the beginning. If desired, these two compounds can be separated by taking advantage of e.g. different solubilities, that is by fractional crystallization. However, other known methods may also be used to achieve the separation. The compounds can, however, also be utilized directly for further reactions and then the products obtained therefrom can be separated from each other. Normally for the process of the invention the hydrocarbyl or heterocyclic groups will have not more than 24 carbon atoms and usually more than 8 carbon atoms.

It has been further found that the metal amides can also be subjected to a transamination. In this case the amino group originally present is preferably derived from an easily volatile amine, such as methylamine, dimethylamine, ethylamine, diethylamine or from ammonia. The transamination can then be carried out with higher boiling amines, for example with those that have been enumerated above. For the expert it is comprehensible that now amines showing substituents are also usable, which normally would be reduced or split off if they were present from the beginning.

Therefore, after the transamination, there can be present in the amino group of the end products as substituents: Cl, Br, F, —OR, —SR, —C(O)R, —C(S)R, —COOR, —OC(O)R, —CONR′R″, —N(R)C(O)R, —N(R)COOR, —N(R)CONR′R″, —NR′R″, —N=NR, =NR, CN, —NO$_2$, —S(O)R, —S(O)$_2$R, —S(O)$_2$OR, —SO$_2$NR′R″, —N(R)S(O)$_2$R, —N(R)S(O)$_2$OR, —SiR$_3$ PR$_2$, BR$_2$ (R=alkyl, cycloalkyl, aralkyl, aryl or alkaryl, R′ and R″=H or R) and many other substituents, as they are found in known amines.

The novel compounds of the invention are useful as polymerization catalysts for olefinically unsaturated compounds, e.g. ethylene, acrylonitrile and vinyl chloride. They are also useful for the preparation of alkyl and aryl aminophosphines by reaction with alkyl and aryl halides. In addition polymeric phosphines and aminocyclophosphines are obtained on hydrolysis.

EXAMPLE 1

Preparation of (C$_2$H$_5$)$_2$NPLi$_2$ and [(C$_2$H$_5$)$_2$N]$_2$PLi. To a solution of 27.4 g. (0.375 mole) of diethylamine in 75 ml. of benzene is dropped a 15% solution of C$_4$H$_9$Li (250 ml.=0.375 mole) in hexane. The solution becomes milky white. Then there are added 7.5 g. (0.25 mole) of white phosphorus. The mixture is refluxed with stirring. After 1½ hours all the phosphorus is consumed. A red-brown mixture is formed. After evaporation of the solvents one obtains the two compounds in quantitative yield in the proportion of 1:1.

EXAMPLE 2

Preparation of (CH$_3$)$_2$NPLi$_2$ and [(CH$_3$)$_2$N]$_2$PLi from 17 g. of dimethylamine (0.375 mole) in 200 ml. of ether, 250 ml. of 15% C$_4$H$_9$Li-hexane solution (0.375 mole) and 7.5 g. (0.25 mole) of white phosphorus, as in Example 1. After refluxing for 3 hours all the phosphorus is consumed. The mixture is orange colored. After evaporation of the solvents one obtains the two compounds in a quantitative yield in the proportion of 1:1.

What I claim is:

1. A process for preparing alkali amino-phosphides of the formulae $$MP(NR^1R^2)_2$$

and $$M_2PNR^1R^2$$

in which M signifies an alkali metal atom and R$^1$ and R$^2$ are each alkyl having not more than 8 carbon atoms or hydrogen atoms, comprising heating white phosphorus and a metal amide of the formula MNR$^1$R$^2$ wherein M, R$^1$ and R$^2$ are as defined hereinabove at a temperature in the range of 30° C. to 120° C. and in the presence of an inert solvent.

2. A process of claim 1 wherein the ratio of phosphorus to metal amide is about 2:3 molar.

3. A process of claim 1 wherein M is lithium, and R$^1$ and R$^2$ are methyl or ethyl, lithium dimethylamide or lithium diethylamide is the metal amide, the ratio of phosphorus to metal amide is about 2:3 molar, ether is used as a solvent in the reaction, and the reaction mixture is heated at temperatures in the range of 30° to 120° C. until the phosphorus is dissolved.

4. An aminophosphide of the formulae $$MP(NR^1R^2)_2$$

or $$M_2PNR^1R^2$$

wherein M is an alkali metal atom and R$^1$ and R$^2$ are each alkyl having not more than 8 carbon atoms or hydrogen atoms.

5. Aminophosphides of claim 4 constituting an equimolar mixture of compounds of each formulae.

6. An aminophosphide of claim 4 wherein M is lithium, and R$^1$ and R$^2$ are methyl.

7. An aminophosphide of claim 4 wherein M is lithium, and R$^1$ and R$^2$ are ethyl.

References Cited

OTHER REFERENCES

Chem. Reviews, vol. 54, p. 444; Fernelius, W. C., Dissertation, Stamford Univ. 1928.

HENRY R. JILES, *Primary Examiner.*

H. I. MOATZ, *Assistant Examiner.*

U.S. Cl. X.R.

252—437; 260—243, 247.5, 249.5, 250, 251, 256.4, 288, 293, 296, 307, 309.6, 310, 315, 319, 326.85, 327, 329, 345.1, 346.1, 346.2